United States Patent [19]

Kuiper et al.

[11] 4,390,794

[45] Jun. 28, 1983

[54] CIRCUIT ARRANGEMENT FOR CONTROLLING THE SWITCH-ON OF SUPPLY VOLTAGE

[75] Inventors: Wilhelmus G. Kuiper; Anne Klaassen, both of Hilversum, Netherlands

[73] Assignee: U.S. Philips Corporation, New York, N.Y.

[21] Appl. No.: 342,528

[22] Filed: Jan. 25, 1982

[30] Foreign Application Priority Data

Jan. 28, 1981 [NL] Netherlands ................ 8100388

[51] Int. Cl.³ ........................................ H01H 9/54
[52] U.S. Cl. .................................... 307/140; 307/141
[58] Field of Search .................. 307/64, 85, 112, 130, 307/140, 141, 141.4

[56] References Cited

U.S. PATENT DOCUMENTS 4,113,419 9/1978 Cade ........................... 307/141 X Primary Examiner—Michael L. Gellner
Assistant Examiner—Derek Jennings
Attorney, Agent, or Firm—Jack Oisher; William J. Streeter; Laurence A. Wright

[57] ABSTRACT

Circuit for the delayed switch-on of a supply voltage in an electric apparatus which has at least a first and a second supply terminal, the series arrangement of the emitter-base path of a first transistor and the collector-emitter path of a second transistor being arranged between the first and the second supply terminals, the base of the second transistor being connected to a voltage divider provided between the collector of the first transistor and the second supply terminal.

3 Claims, 3 Drawing Figures

CIRCUIT ARRANGEMENT FOR CONTROLLING THE SWITCH-ON OF SUPPLY VOLTAGE

The invention relates to a circuit arrangement for controlling the switch-on of a supply voltage in an electrical apparatus which has first and second supply terminals, the series arrangement of the emitter-base path of a first transistor and the collector-emitter path of a second transistor being arranged between the first and the second supply terminals, the base of the second transistor being connected to a voltage divider provided between the collector of the first transistor and the second supply terminal. Circuits of this type are used, in, for example, carrier supply units in transmission systems. In such systems problems may be encountered when a defective apparatus has to be removed from the carrier supply unit rack and when spare equipment has to be installed in the carrier supply unit rack. When this is done disturbances may occur due to the random sequence in which contact springs of the apparatus make or break contact during mounting the apparatus in or removing the apparatus from the rack. During the mounting of a new apparatus in the rack, measures must be taken to prevent a change-over occurring from the apparatus in operation to the new apparatus. Such a change-over may possibly occur several times in succession, the carrier being briefly interrupted each time this occurs, which is undesirable.

BACKGROUND OF THE INVENTION

A circuit of the type defined in the foregoing is disclosed in German Auslegeschrift No. 2,647,428. In the carrier supply unit described there each electrical apparatus is provided with a spare apparatus so that in the event of breakdown of one of the apparatuses a spare apparatus is immediately switched-on with the aid of a change-over circuit and a supervisory circuit. Both apparatuses are of an identical construction, so that in normal conditions there is no preference for one apparatus over the other. It is consequently not necessary to change-over again to the new apparatus after the defective apparatus has been replaced. This has the advantage that the disturbances in the system, mentioned in the foregoing, are reduced.

In the prior art circuit a delay circuit is provided between the change-over circuit and the supervisory circuit. This makes it possible to replace the defective apparatus by a new apparatus during the delay produced by the delay circuit. The supply voltage will not be connected to the new apparatus until after the said delay has elapsed, thus reducing the disturbances mentioned in the foregoing even further.

SUMMARY OF THE INVENTION

This prior art circuit has the disadvantage that it comprises many components. The present invention has for an object to provide a circuit which requires a considerably lower number of components. Accordingly, the circuit arrangement is characterized in that a second series arrangement of a resistor, a photodiode, a Zener diode and a switching element is arranged between the first and second supply terminals, the collector of the first transistor being connected to a point on the second series arrangement via at least a diode.

The last-mentioned diode may be a stabistor the cathode of which is connected to the cathode of the Zener diode, the forward voltage of the stabistor exceeding the forward voltage of the photodiode.

As an alternative the collector of the first transistor may be connected via the series arrangement of a diode and a second Zener diode, to that end of the resistor in the second series arrangement which is remote from the first supply terminal.

BRIEF DESCRIPTION OF THE DRAWINGS

Embodiments of the invention will now be described in detail by way of non-limitative example with reference to the accompanying drawings in which.

DETAILED DESCRIPTION OF THE PREFERRED EMBODIMENTS

Figure 1:
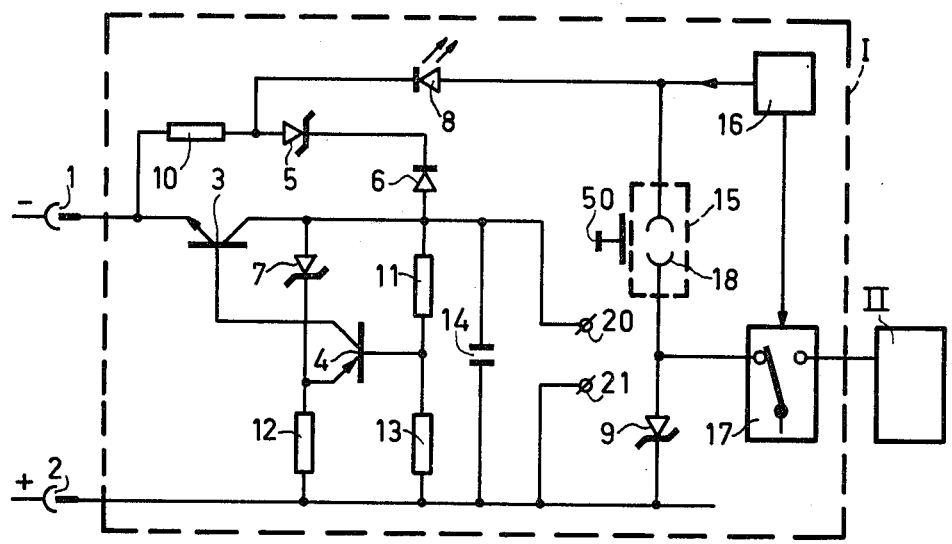
FIG. 1 shows a first embodiment.

In the electrical apparatus I shown in FIG. 1, reference numeral 1 denotes a first supply terminal and reference numeral 2 denotes a second supply terminal. A circuit arrangement for controlling the switch-on of the supply voltage in the apparatus includes series arrangement of the emitter-base path of a first transistor 3, the collector-emitter path of a second transistor 4 and a resistor 12, arranged between the supply terminal 1 and the supply terminal 2. The base of the second transistor 4 is connected to a voltage divider formed by resistors 11 and 13, which divider is provided between the collector of the first transistor 3 and the second supply terminal 2. The emitter of the second transistor 4 is connected to the collector of the first transistor 3 via a Zener diode 7. A second series arrangement formed by a resistor 10, a photodiode 8, a switching element 15 and a Zener diode 9 is also arranged between the first supply terminal 1 and the second supply terminal 2. The junction of the resistor 10 and the photodiode 8 is connected to the collector of the first transistor 3 via the series arrangement of a Zener diode 5 and a diode 6. A capacitor 14 is provided between the collector of the first transistor 3 and the second supply terminal 2. Points 20 and 21 form supply points for a further portion of the apparatus, which is not shown as it being of no importance in the present context. The junction of the photodiode 8 and the switching element 15 is connected to an alarm circuit 16, which may be of any suitable known construction. The junction of the switching element 15 and the Zener diode 9 is connected to a change-over circuit 17 which alarm circuit 16 causes to automatically switch on a spare and identical apparatus II when the apparatus I becomes defective. This change-over circuit may be of any suitable known construction. The operation of the circuit shown in FIG. 1 is as follows:

When the apparatus I becomes defective, the alarm circuit 16 energizes the change-over circuit 17 in such a manner that the spare apparatus II is automatically rendered operative. An engineer then places the contact plug 50 in the contact holder 18 of the switching element 15 at apparatus II resulting in a voltage appearing across the Zener diode 9. This voltage is of such a magnitude that the change-over circuit 17 of apparatus II is locked in its present state, thereby ensuring that the spare apparatus II remains operative, during the subsequent removal of the defective apparatus I from the supply unit rack. The defective apparatus is then removed and an identical, new apparatus I is placed in the rack, the contact plug 50 being plugged into the contact holders 18 in the new apparatus I and the apparatus II while this is being done. The result of this is that, during the mounting of the new apparatus in the rack, the supply voltage stabilization circuit of the new apparatus I, formed by the transistors 3 and 4, the resistors 11, 12 and 13, the Zener diode 7 and the capacitor 14, cannot become operative owing to the fact that the Zener voltage of the Zener diode 9 plus the forward voltage of photodiode 8 is less than the Zener voltage of the Zener diode 5 plus the voltage across the diode 6. The Zener diode 5 will therefore not be conductive, so that the base of the transistor 4 is not supplied with current. As a result the transistors 3 and 4 cannot be rendered conductive. Furthermore, the change-over circuit in apparatus II is locked. When the new apparatus has been placed in the supply unit rack and it has been checked that all contacts have been made, the contact plugs 50 are removed from the contact holders 18. When this is done the supply voltage stabilization circuit of the new apparatus can become operative; the Zener diode 5 and the diode 6 are rendered conductive, in response to which the base of the transistor 4 is supplied with current. As a result thereof the transistors 3 and 4 will start conducting. Moreover, the locking of the change-over circuit in apparatus II is eliminated.

When the supply voltage in the new apparatus has reached its operating value the contact plug 50 can be inserted into the contact holder 18 again, if required, without causing the stabilized voltage at the points 20 and 21 to disappear again. Insertion of the plug will, however, cause a voltage of such a value to be generated across the Zener diode 9 that the change-over circuit 17 is locked again, as required in the event of this new apparatus having to be removed from the rack when it has become defective if disturbances of the type described in the preamble are to be prevented from occurring.

The photodiode 8 and the switching element 15 may be provided on the front panel of the electric apparatus I. In the normal operating condition the photodiode 8 will not be conductive and will not light up. If, however, a defect occurs in the apparatus I, the alarm circuit 16 will render the change-over circuit 17 operative and, in addition, the photodiode 8 will be driven in such a manner that it lights up.

Figure 2:
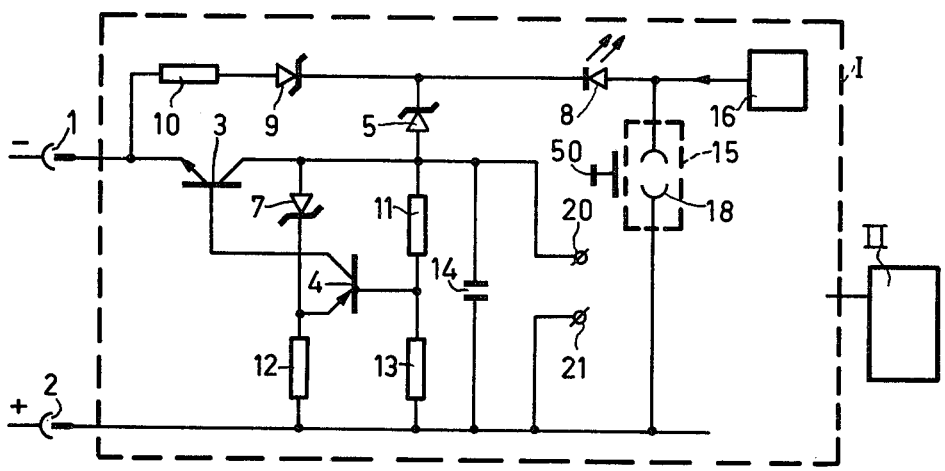
FIG. 2 shows a second embodiment.

In the electric apparatus I shown in FIG. 2 similar components are given the same references as their counter part in FIG. 1. Thus reference numeral 1 again denotes a first supply terminal and reference numeral 2 a second supply terminal, which are connectable to the supply points — and + respectively of, for example, a carrier supply unit rack. A circuit arrangement for controlling the switch-on of the supply voltage in the apparatus again includes a series arrangement of the emitter-base path of a first transistor 3, the collector-emitter path of a second transistor 4 and a resistor 12, arranged between the supply terminals 1 and 2. The base of the second transistor 4 is connected to a point on a voltage divider formed by resistors 11 and 13, which is arranged between the collector of the first transistor 3 and the second supply terminal 2. The emitter of the second transistor 4 is connected to the collector of the first transistor 3 via a Zener diode 7. A second series arrangement formed by a resistor 10, a Zener diode 9, a photodiode 8 and a switching element 15 is arranged between the first supply terminal 1 and the second terminal 2. The junction of the Zener diode 9 and the photodiode 8 is connected to the collector of the first transistor 3 via a stabistor 5. A capacitor 14 is provided between the collector of the first transistor 3 and the second supply terminal 2. The points 20 and 21 are points from which a further portion of the electric apparatus I is supplied, which further portion is not shown in the drawing. The junction of the photodiode 8 and the switching element 15 is connected to an alarm circuit 16, which may be of any suitable known construction. The circuit shown in FIG. 2 operates as follows:

When the electric apparatus I has become defective and must be replaced by a new apparatus, the contact plug 50 is inserted into the contact holders 18 in apparatus II and in the new apparatus. Thereafter the new apparatus is placed in the supply unit rack and connected. As long as the contact plug 50 is in the contact holder 18 of the new apparatus the supply voltage stabilization circuit of the new apparatus cannot become operative, owing to the fact that the stabistor 5 remains in the cutoff state (its forward voltage is less than the forward voltage of photodiode 8) and consequently no voltage is present at the collector of the transistor 3. As a result the new apparatus cannot exert any influence on the spare apparatus II then operative, which was automatically switched on, in a similar manner to that described with reference to FIG. 1, when the electric apparatus I became defective. When it has been checked that all contacts between the newly placed apparatus and the supply unit rack have been made the contact plugs 50 are removed from the contact holders 18 of the two apparatuses. The supply voltage to the further portion of the new apparatus can now increase to its operating value and the new apparatus now functions as the replacement apparatus for the spare apparatus II then operative.

Once the supply voltage to the further portion of the new apparatus has been switched on, said supply voltage will not be switched off again if the contact plug is again inserted into the contact holder 18, as the stabistor 5 will remain in the non-conductive state.

Figure 3:
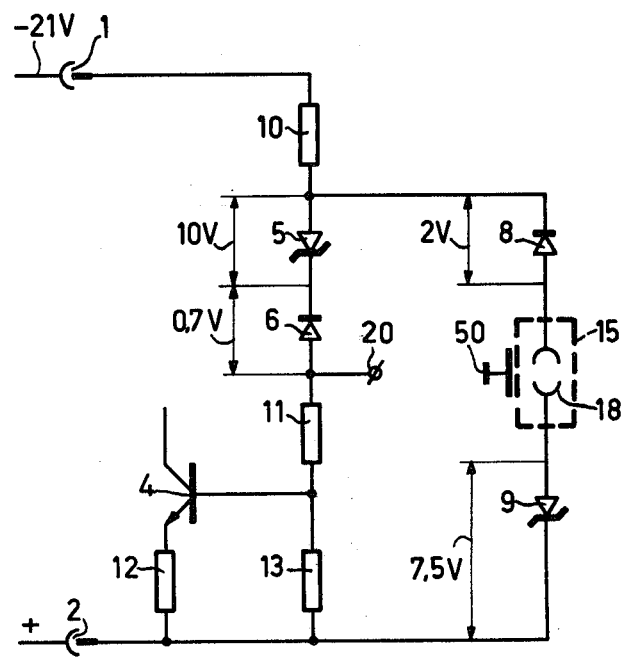
FIG. 3 shows a numerical example to explain the operation of the circuit of FIG. 1.

In FIG. 3 the operation of the circuit of FIG. 1 is illustrated in greater detail with reference to a numerical example. The respective values of the resistors 10, 11 and 13 are 787Ω; 10.5 KΩ and 19.6 KΩ. The sum of the Zener voltage of the Zener diode 5 and the forward voltage of the diode 6 is equal to 10.7 Volts. The Zener voltage of the Zener diode 9 is equal to 7.5 Volts. The forward voltage of the photodiode 8 is equal to 2 Volts. The forward voltage of the base-emitter junction of the transistor 4 is equal to 0.7 Volts. The transistor 3 will not conduct as long as no base current flows to it. This base current must flow from the supply terminal 2 to the base of the transistor 3 via resistor 12 and the emitter-collector path of the transistor 4. The transistor 4 does not become conductive until current is applied to its base. This base current flows from the supply terminal 2 to the point 20 via the resistor 12, the emitter-base path of the transistor 4 and the resistor 11. As long as neither the transistor 3 nor the series combination of diodes 5 and 6 conducts no potential reaches point 20, so that the base of transistor 4 is not supplied with current and it will never be possible for transistor 3 to start conducting. In order to start the circuit voltage $\geq 0.7$ Volts must be applied to the base-emitter junction of the transistor 4.

If the contact plug 50 is inserted into the contact holder 18 and if thereafter the supply voltage is applied to the terminals 1 and 2, the voltage at the anode of the Zener diode 5 becomes equal to −9.5 Volts, being the sum of the voltages across the photodiode 8 and the Zener diode 9. In that event the Zener diode 5 and the diode 6 are cutoff, since the Zener voltage ($-10$ V) of the Zener diode 5 is not reached. The transistor 4 therefore remains in the non-conductive state. If now the contact plug 50 is removed from the holder 18 the voltage at the base of the transistor 4 becomes equal to $$\frac{-(21 - 10.7)}{0.787 + 10.5 + 19.6} \times 19.6 = -6.5 \text{ Volts.}$$

The transistor 4 and consequently also the transistor 3 will now become conductive. The circuit is, for example, such that in operation the voltage at the supply point 20 is stabilized at $-18$ Volts. Thus with $-21$ volts at point 1 the emitter-collector voltage of the transistor 3, i.e. the difference voltage between the supply terminal 1 and the supply point, is $-3$ Volts. This results in the Zener diode 5 and the diode 6 becoming non-conducting again. If the contact plug 50 is subsequently reinserted into the contact holder 18 this will have no influence whatsoever on the stabilization circuit including the transistors 3 and 4, as in such an event the voltage on the anode of the Zener diode 5 will be $-9.5+18=8.5$ Volts, positive with respect to the supply point 20, so that the diode 6 will be in the non-conducting state.

What is claimed is:

1. A circuit arrangement for controlling the switch-on of a supply voltage in an electrical apparatus which has first and second supply terminals, the series arrangement of the emitter-base path of a first transistor and the collector-emitter path of a second transistor being arranged between the first and second supply terminals, the base of the second transistor being connected to a voltage divider provided between the collector of the first transistor and the second supply terminal, characterized in that a second series arrangement of a resistor, a photodiode, a Zener diode and a switching element is arranged between the first and second supply terminals, the collector of the first transistor being connected to a point on the second series arrangement via at least a diode.

2. A circuit arrangement as claimed in claim 1, characterized in that last-mentioned diode is a stabistor, the cathode of which is connected to the cathode of the Zener diode, the forward voltage of the stabistor exceeding the forward voltage of the photodiode.

3. A circuit arrangement as claimed in claim 1, characterized in that the collector of the first transistor is connected via the series arrangement of a diode and a second Zener diode to that end of the resistor in the second series arrangement which is remote from the first supply terminal.

* * * * *